(12) United States Patent
Suzuki et al.

(10) Patent No.: US 8,346,086 B2
(45) Date of Patent: Jan. 1, 2013

(54) OPTICAL SIGNAL PROCESSING DEVICE

(75) Inventors: Kenya Suzuki, Atsugi (JP); Naoki Ooba, Atsugi (JP); Motohaya Ishii, Atsugi (JP); Shinji Mino, Atsugi (JP); Kazunori Seno, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 359 days.

(21) Appl. No.: 12/867,237

(22) PCT Filed: Feb. 20, 2009

(86) PCT No.: PCT/JP2009/052967
§ 371 (c)(1),
(2), (4) Date: Aug. 11, 2010

(87) PCT Pub. No.: WO2009/104715
PCT Pub. Date: Aug. 27, 2009

(65) Prior Publication Data
US 2010/0316385 A1    Dec. 16, 2010

(30) Foreign Application Priority Data
Feb. 20, 2008    (JP) .................................. 2008-039327

(51) Int. Cl.
*H04J 14/02*    (2006.01)
(52) U.S. Cl. ......................................................... 398/79
(58) Field of Classification Search .................... 398/79, 398/81
See application file for complete search history.

(56) References Cited

U.S. PATENT DOCUMENTS
6,122,419 A    9/2000    Kurokawa et al.
6,493,502 B1 *    12/2002    Deliwala ........................ 385/140

FOREIGN PATENT DOCUMENTS
| EP | 1 452 897 | 9/2004 |
| JP | 11-231156 | 8/1999 |
| JP | 2000-98150 | 4/2000 |
| JP | 2001-255424 | 9/2001 |
| JP | 2002-250828 | 9/2002 |
| JP | 2006-284632 | 10/2006 |

OTHER PUBLICATIONS

Decision to Grant a Patent, dated Jul. 29, 2011 issued in Japanese Application No. 2009-554384 that relates to the priority application PCT/JP2009/052967.

(Continued)

*Primary Examiner* — Shi K Li
(74) *Attorney, Agent, or Firm* — Workman Nydegger (57) ABSTRACT

A conventional optical signal processing device had a disadvantage where the temperature dependency of the spectroscopic characteristics of a spectroscopic element causes a deteriorated performance. In order to solve the temperature dependency, there has been a method to form a plurality of grooves for dividing a core on the array waveguide of the AWG. However, this method cannot avoid an excess loss and causes a high manufacture cost. By directly controlling the modulation characteristic profile formed by an element device of a spatial light modulator, athermalization can be achieved in a simpler and low-cost manner. This consequently provides a remarkable reduction of the light coupling loss in the spatial optical system of the optical signal processing device. More accurate temperature compensation can be realized that copes with an actual behavior of the device to a temperature fluctuation, including causing factors of a complicated temperature fluctuation of the optical system.

19 Claims, 6 Drawing Sheets

OTHER PUBLICATIONS

H. Takenouchi et al., *8THz Bandwidth Dispersion-Slope Compensator Module for Multiband 40Gbit/s WDM Transmission Systems Using an AWG and Spatial Phase Filter*, Electronics Letters, Jun. 7, 2001, vol. 37, No. 12, pp. 777-778.

Kebin Li et al., *Coherent Micromirror Arrays*, Optics Letters, vol. 27, No. 5, Mar. 1, 2002, pp. 366-368.

Michael A. F. Roelens, et al., *Dispersion Trimming in a Reconfigurable Wavelength Selective Switch*, Journal of Lightwave Technology, vol. 26, No. 1, Jan. 1, 2008, pp. 73-78.

M. Shirasaki et al., *Virtually Imaged Phased Array with Graded Reflectivity*, IEEE Photonics Technology Letters, vol. 11, No. 11, Nov. 1999, pp. 1443-1445.

PCT/JP2009/052967, Mar. 24, 2009, International Search Report.

* cited by examiner

OPTICAL SIGNAL PROCESSING DEVICE

TECHNICAL FIELD

The present invention relates to an optical signal processing device. More particularly, the present invention relates to the temperature compensation of the optical signal processing device including a spectroscopic means.

BACKGROUND ART

With more optical communication networks having a higher speed and a higher capacity, increasing demands have been placed on optical signal processing devices for performing the processing of Wavelength Division Multiplexing (WDM) optical signals. For example, a multiplexed optical signal at a node is not subjected to an optical to electrical conversion but the optical signal is directly subjected to a path switching. Thus, transparent optical signal processing devices have been promoted.

On the other hand, from the viewpoint of the downsizing and integration of an optical signal processing device, Planar Lightwave Circuits (PLC) have been researched and developed. The PLC is structured so that a silicon substrate for example has thereon a core made of silica glass to integrate various functions in one PLC chip, thus realizing an optical functional device having a small loss and high reliability. Furthermore, a complex optical signal processing devices appeared that is a combination of a plurality of PLC chips and other optical functional devices.

For example, Patent Publication 1 discloses an optical signal processing device that is a combination of a Planar Lightwave Circuit (PLC) including an Arrayed Waveguide Grating (AWG) for example and a spatial light modulator such as a liquid crystal device. More particularly, a wavelength blocker consisting of a PLC and a collimating lens symmetrically provided to sandwich a liquid crystal device at the center, a wavelength equalizer and a dispersion compensator for example have been examined. In these optical signal processing devices, a plurality of optical signals having different wavelengths are independently subjected to an optical signal processing for each wavelength.

Figure 6:
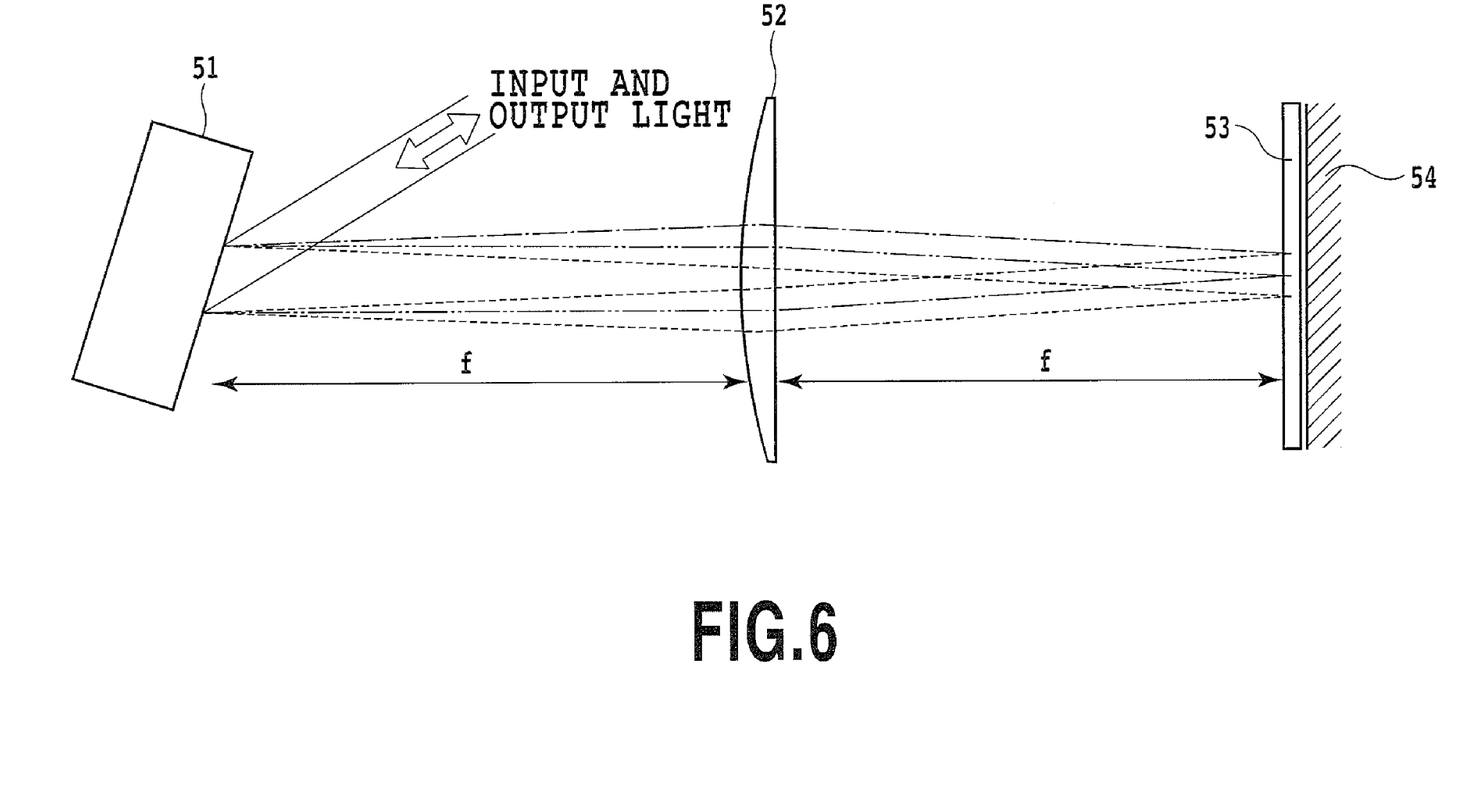
FIG. 6 is a schematic view illustrating a conventional optical signal processing device.

FIG. 6 is a schematic diagram illustrating one example of an optical signal processing device. In this optical signal processing device, an optical signal is inputted and outputted via a spectroscopic element 51. The spectroscopic element 51 demultiplexes a WDM optical signal by outputting the signal at an outgoing angle θ depending on the wavelength thereof. The demultiplexed optical signal is outputted to a focusing lens 52. The optical signal focused by the focusing lens 52 is focused, in accordance with the outgoing angle θ, at each focusing point at a predetermined position of the signal processing device 53 having a function of intensity modulation or phase modulation or beam steering. Specifically, it is noted that the optical signal is focused at a different position of the signal processing device depending on the wavelength of the input optical signal. The signal processing device 53 is a liquid crystal device consisting of a plurality of element devices (pixels) for example. By the control of the transmittance of each element device for example, an optical signal of each wavelength is subjected to intensity modulation for example, thereby realizing a predetermined optical signal processing function. The optical signal subjected to the optical signal processing is reflected by a mirror 54 to thereby invert the traveling direction. Then, the optical signal passes through the focusing lens 52 and is multiplex again by the spectroscopic element 51. As is commonly well known, the spectroscopic element 51 also can multiplex an optical signal by changing the traveling direction of the optical signal to a direction opposite to that during demultiplexing. A multiplexed optical signal of each wavelength is outputted again to the outside of the optical signal processing device as output light.

In FIG. 6, the spectroscopic element 51 is schematically shown and may be any spectroscopic element so long as the spectroscopic element 51 can demultiplex and multiplex an optical signal depending on the wavelength of the optical signal. For example, the spectroscopic element may be a grating, a prism, or Arrayed Waveguide Grating (AWG) for example. The signal processing device may be the one that can modulate the intensity or phase of an optical signal, that can modulate the intensity and phase, or that can subject the traveling direction of an optical signal to a beam steering. For example, the signal processing device includes a liquid crystal device, a Micro Electro Mechanical Systems (MEMS) mirror, and optical crystal for example. The optical crystal may be any one including electrical optical crystal typical example of which is $LiNbO_3$ so long as the optical crystal can achieve a desired modulation.

The optical signal processing device shown in FIG. 6 has a configuration in which a mirror is used to reciprocate an optical signal so that a single spectroscopic element can demultiplex and multiplex the optical signal. This configuration is generally called a reflection type. A device that performs an optical signal processing such as a wavelength blocking is not limited to this configuration. For example, another configuration is also possible in which, without using the mirror of FIG. 6, signal processing devices are positioned on symmetry planes and an outgoing system consisting of another one lens and a spectroscopic element is provided at a position that is on an extended line of an incident light path axis and that is symmetric to the incoming system with regard to the symmetry plane. This configuration is a configuration where the demultiplexing and multiplexing of an optical signal are performed respectively via independent incoming system outgoing system and is called a transmission type. Furthermore, by changing the direction of the mirror in the device configuration of FIG. 6, another configuration is also possible where an outgoing system that is provided at an arbitrary position and that consists of another one lens and a spectroscopic element is used to multiples an optical signal. For example, another configuration is also possible where the reflecting plane of a mirror is inclined by 45 degrees to the incident light path of an optical signal and a lens provided in a vertical direction to the incident light path and a spectroscopic element are used to configure an outgoing system. Another configuration also can include a plurality of outgoing systems when the signal processing device has a beam steering function.

In FIG. 6, the spectroscopic element 51 and the focusing lens 52 are provided to have a Front Focal Length (FFL) therebetween. The signal processing device 53 and the focusing lens 52 are provided to have a Back Focal Length (BFL) therebetween. The focal point of light focused by the focusing lens 52 must on a surface of the mirror 54 at all wavelengths used. Displacement of the focal point from the mirror surface causes a disadvantage of an increased coupling loss of light. Another disadvantage is that the focused optical signal has an increased beam spot diameter, thus causing a disadvantage of a decreased wavelength resolution.

Furthermore, the signal processing device 53 must include a spatially-periodic structure in order to selectively modulate an optical signal in accordance with each wavelength. For example, when the signal processing device 53 is a liquid crystal device, the liquid crystal device must have an element device that has a structure designed in accordance with the optical characteristic of the spectroscopic element and the focusing lens.

More specifically, it is known that the wavelength dependency of the focusing position on a signal processing device follows a value obtained by multiplying an angular dispersion value of a spectroscopic element with a focal length of a focusing lens. The wavelength dependency of the focusing position is also called a linear dispersion value of a spectroscopic optical system. The linear dispersion value of an optical system determined by a spectroscopic element and a focusing lens must sufficiently match the linear dispersion value used for the design of the signal processing device. Any displacement between these linear dispersion values causes an unmatching between the position of the focusing point of an actual optical signal and the positions of the individual element devices of the signal processing device (e.g., pixels of a liquid crystal shutter device), thus failing to perform a desired processing.

Patent Publication 1: Japanese Laid-Open Publication No. 2002-250828 (page 16, page 19, FIG. 20, FIG. 27, FIG. 29D for example) Patent Publication 2: Japanese Laid-Open Publication No. 2001-255424 Non-Patent Publication 1: H. Takenouchi, T. Ishii, T. Goh, "8 THz bandwidth dispersion-slope compensator module for multiband 40 Gbit/s WDM transmission system using an AWG and spatial phase filter", Electronics Letters, Vol. 37, No. 12, pp. 777-778, 2001 Non-Patent Publication 2: K. Li et al., "Coherent micromirror arrays,", Optics Letters, Vol. 27, No. 5, pp. 366-368, 2002

DISCLOSURE OF THE INVENTION

However, in a conventional optical signal processing device, a disadvantage has been caused in which the temperature dependency of the spectroscopic characteristics of the spectroscopic element causes a temperature change which causes a deteriorated performance of the optical signal processing device. In the optical signal processing device of the configuration shown in FIG. 6, a case will be considered where the spectroscopic element is AWG. Even in the case of optical signals having the same wavelength, a temperature change causes a change in the outgoing angle thereof, which causes a fluctuation of the position of the focusing point on the signal processing device. This consequently causes a temperature dependency in the signal processing characteristic (e.g., light loss) and a phase shift given to an optical signal.

Conventionally, in order to solve the temperature dependency of the spectroscopic characteristics of AWG, an approach has been considered to reduce the temperature dependency of the spectroscopic characteristics of AWG itself. For example, Patent Publication 2 discloses a technique to perform temperature compensation by a configuration where an array waveguide of AWG include a plurality of characteristic grooves dividing a core. However, this technique cannot avoid an excess loss of about 1 dB even when the grooves have an optimal shape so that the loss can be minimized. Furthermore, the formation of the groove structure requires an addition of a complicated step to the manufacture of AWG, thus causing a disadvantage of a high manufacture cost.

A disadvantage caused by the temperature dependency of the spectroscopic characteristics of AWG also may cause a disadvantage in an optical signal processing device not including a focusing lens. As described above, it has been required to solve, in a simple and low-cost manner, the disadvantage of the temperature dependency of the performance of an optical signal processing device caused by the temperature dependency of the spectroscopic characteristics owned by AWG.

In order to achieve the objective as described above, the present invention which will be described below is an optical signal processing device characterized in that the optical signal processing device for dispersing an input optical signal to a plurality of optical signals having different wavelengths and subjecting the optical signals of the respective wavelengths to a signal processing, comprising: a spectroscopic means for dispersing the input optical signal to a plurality of optical signals having different wavelength to output the plurality of optical signals at an angle depending on the wavelength of the optical signal in a dispersion plane; a signal processing means for modulating the optical signal emitted from the spectroscopic means, the signal processing means includes a plurality of signal processing element devices provided in an intersection direction between the signal processing means and the dispersion plane, the respective plurality of signal processing element devices can control a modulation amount to the optical signals; a temperature detection means for detecting a temperature of the spectroscopic means or an optical system including the spectroscopic means to supply a temperature detection signal; and a temperature compensation control section for controlling, based on the temperature detection signal, an optical signal modulation profile formed by the plurality of signal processing element devices; wherein the optical signal modulation profile is controlled so as to follow a temperature fluctuation of a position of an optical signal on the intersection of the signal processing means or an incident angle to the intersection of the signal processing means, the temperature fluctuation is caused by a temperature dependency of the spectroscopic means or the optical system including the spectroscopic means.

The signal processing means herein also called a signal processing device. The signal processing means includes, in accordance with the contents of a more specific signal processing, a spatial light modulator, a spatial phase control device, a spatial phase modulator, and a spatial intensity modulator for example. The spatial light modulator may be the one that can subject an optical signal to a signal processing such as modulation with regard to the phase or the amplitude thereof or both of the phase and the amplitude. The signal processing element device may be, for example, a liquid crystal device, an element device of Liquid Crystal On Silicon (LCOS), or individual mirror devices of MEMS.

Another embodiment of the present invention is characterized in that the optical signal processing device further comprising: a focusing means for focusing the dispersed optical signal to an optical signal focusing plane of the signal processing means, the focusing means is located in a light path between the spectroscopic means and the signal processing means, wherein the signal processing element devices are arranged with an arrangement pitch that is smaller than a beam diameter of the optical signal focused by the focusing means.

Preferably, the signal processing element device of the signal processing means is a spatial intensity modulation device that modulates the intensity of an optical signal. The temperature compensation control section is used to set an intensity modulation pattern depending on the temperature detection signal.

The signal processing element device of the signal processing means is a spatial phase modulation device that can give a predetermined phase shift to an optical signal. The temperature compensation control section may be used to set the phase pattern depending on the temperature detection signal.

More preferably, the optical signal processing device can be a dispersion compensator that uses a spatial phase modulator as the signal processing means. Furthermore, as the optical signal modulation profile, a phase pattern according to a quadratic function or a remainder having 2π as a divisor and a quadratic function as a dividend is given to the coordinate axis of the intersection direction and the plurality of signal processing element devices are controlled so as to move the phase pattern in the intersection direction by a distance corresponding to the temperature detection signal.

The optical signal processing device also can be a wavelength blocker in which a plurality of the signal processing element devices are allocated to each optical signal, and the wavelength blocker uses a spatial intensity modulator as the signal processing means. Furthermore, the optical signal processing device also can be a tunable wavelength filter using a spatial phase modulator as the signal processing means.

Furthermore, the temperature compensation control section preferably includes a means for storing data for controlling the signal processing element devices such that the optical signal modulation profile formed by the plurality of signal processing element devices becomes an optical signal modulation profile corresponding to a temperature of the spectroscopic means or an optical system including the spectroscopic means detected by the temperature detection means.

The spectroscopic means may be an arrayed waveguide grating (AWG). The signal processing means may be any of a liquid crystal device, MEMS, or optical crystal.

As described above, according to the present invention, a temperature fluctuation in the performance of the optical signal processing device caused by the temperature dependency of the spectroscopic characteristics owned by the spectroscopic means can be suppressed, in a simpler and low-cost method, by directly controlling the modulation characteristic profile formed based on a configuration unit of the spatial light modulator. Furthermore, more accurate temperature compensation also can be provided in accordance with the real behavior of the device to a temperature fluctuation including causing factors of a complicated temperature fluctuation in the entire optical system. The same effect also can be expected also in the case where AWG is used as the spectroscopic means.

BRIEF DESCRIPTION OF THE DRAWINGS

FIGS. 1(a) and 1(b) illustrate the configuration of an optical signal processing device for which the temperature dependency of AWG according to the illustrative embodiment 1 of the present invention is compensated. FIG. 1 (a) is a top view. FIG. 1(b) is a side view;

BEST MODE FOR CARRYING OUT THE INVENTION

The following section will describe an embodiment of the present invention with reference to the drawings. An optical signal processing device of the present invention solves the temperature dependency of the performance of the optical signal processing device caused by the temperature dependency of the spectroscopic characteristics of the AWG by directly controlling the optical signal modulation profile formed by a signal processing element device included in the signal processing device (signal processing means). More specifically, by directly controlling the optical signal modulation profile that is formed based on a plurality of element devices of the spatial light modulator as a signal processing device as a modulation unit, the need for the temperature compensation of AWG itself is eliminated. By the temperature compensation action of the spatial light modulator, the optical characteristic can be independent from a temperature by a simpler configuration than in the conventional technique. By using a function of an existing configuration element without adding a movable mechanism, the need for the temperature compensation to AWG itself is eliminated. The manufacture step of AWG is simplified to thereby achieve a lower cost.

Illustrative Embodiment 1

FIGS. 1(a) and 1(b) illustrate the configuration of an optical signal processing device according to the illustrative embodiment 1 of the present invention. The present invention can be applied to an optical signal processing device that includes a spatial phase control device having a plurality of element devices as a signal processing device. FIG. 1(a) is a top view. FIG. 1(b) is a side view. In the illustrative embodiment 1, the operation will be described by way of a dispersion compensator in which the feature of the present invention can be achieved at the maximum. With reference to FIG. 1(a), the dispersion compensator according to the present invention is composed of: a circulator 11 for inputting and outputting an optical signal; an Arrayed Waveguide Grating 1 (hereinafter referred to as AWG) configuring spatial optical system; a cylindrical lens 6; a focusing lens 7; and a spatial phase control device 8. An inputted optical signal is reflected by the spatial phase control device 8 and an optical signal is outputted via the same AWG 1, which constitutes the so-called reflection type optical signal processing system. The spatial phase control device realizes the dispersion compensator unique to the present invention.

More specifically, an optical signal inputted by input fiber 10 enters the input waveguide 2 of the AWG 1 via the circulator 11 and connection fiber 13. The optical signal having entered the input waveguide 2 propagates to an array waveguide 4 via a slab waveguide 3. The array waveguide 4 is composed of a plurality of neighboring waveguides having a waveguide length difference L. In the array waveguide 4, an optical signal having a different wavelength is demultiplexed. Specifically, an optical signal emitted from an outgoing end 5 propagates within an x-z plane (dispersion plane) in the z axis direction at a different outgoing angle $\theta_A$ depending on the wavelength toward the focusing lens 7.

Also with reference to FIG. 1(b), the optical signal emitted from the outgoing end 5 is formed into collimated beam of a width Wy in a thickness direction of the AWG substrate (i.e., y direction) by the cylindrical lens 6. On the other hand, in the x direction in the x-z plane including the AWG substrate, the optical signal is formed by the slab waveguide 3 into collimated beam having a sufficiently-wide width Wx. Specifically, the optical signal emitted from the outgoing end 5 of the AWG 1 can be considered as collimated beam within the x-z plane. By passing through the cylindrical lens 6, the optical signal can be considered as collimated beam both in the x direction and the y direction.

Then, the optical signal turns to convergence beam by the focusing lens 7 and has a focal point on the spatial phase control device 8. By the linear dispersion action of the AWG 1, the focusing position on the spatial phase control device 8 has a different position depending on the wavelength. For example, depending on the wavelength of the optical signal, the optical signal focuses the point P or point Q. The optical signals of the respective wavelengths receive, as described later, a desired phase shift given by the spatial phase control device 8 characterized in the present invention. The optical signal is reflected by a mirror corresponding to the respective pixels arranged in the spatial phase control device 8. The reflected optical signal propagates the same light path as the outward path in the z axis direction in an opposite direction toward an input port 2. Then, the optical signal is outputted through output fiber 12 via the connection fiber 13 and the circulator 11.

The AWG 1 has thereon a temperature detection means 15 to generate a temperature detection signal showing the temperature of the AWG 1. The temperature detection signal is supplied to a temperature compensation control section 16. The temperature compensation control section 16 includes CPU and a memory for example and provides a control so as to appropriately drive the spatial phase control device 8 depending on the temperature detection signal. The memory can store data that is set to the spatial phase control device 8 regarding the temperature detection signal.

The temperature compensation control section 16 supplies a control signal to a spatial phase control device driving section 17. The spatial phase control device driving section 17 supplies a driving signal to the spatial phase control device 8 to thereby set a predetermined optical signal modulation profile (i.e., phase distribution). A driving signal may be a signal of various forms depending on the type of the spatial phase control device 8.

In the present invention, the phase distribution given to the spatial phase control device 8 determines the operation as a dispersion compensator. The quadratic phase distribution represented by the following formula is given to the spatial phase control device 8. Specifically, when assuming that the intersection of the spatial phase control device 8 with a dispersion plane is the u axis, φ(u) of the phase distribution is represented by the following formula.

$$\phi(u) = k2 \times (u - u_0)^2 \text{(rad)} \quad \text{formula (1)}$$

In the formula, $u_0$ denotes a position at which center wavelength light of the optical signal irradiates the spatial phase control device 8. k2 denotes a coefficient. By changing k2, the dispersion value given to the input optical signal can be changed as disclosed in Non-Patent Publication 1.

Figure 1:
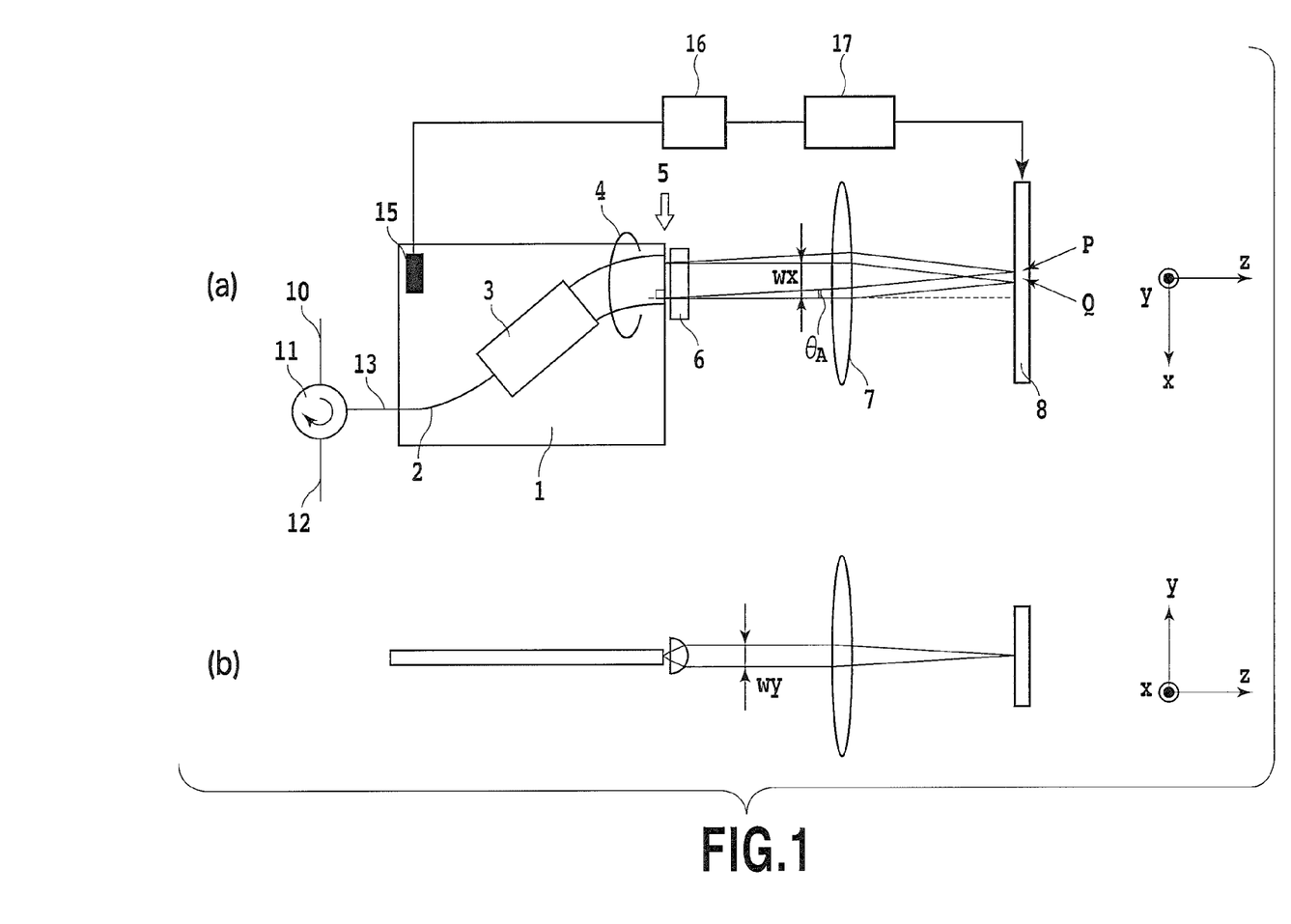
Figure 2:
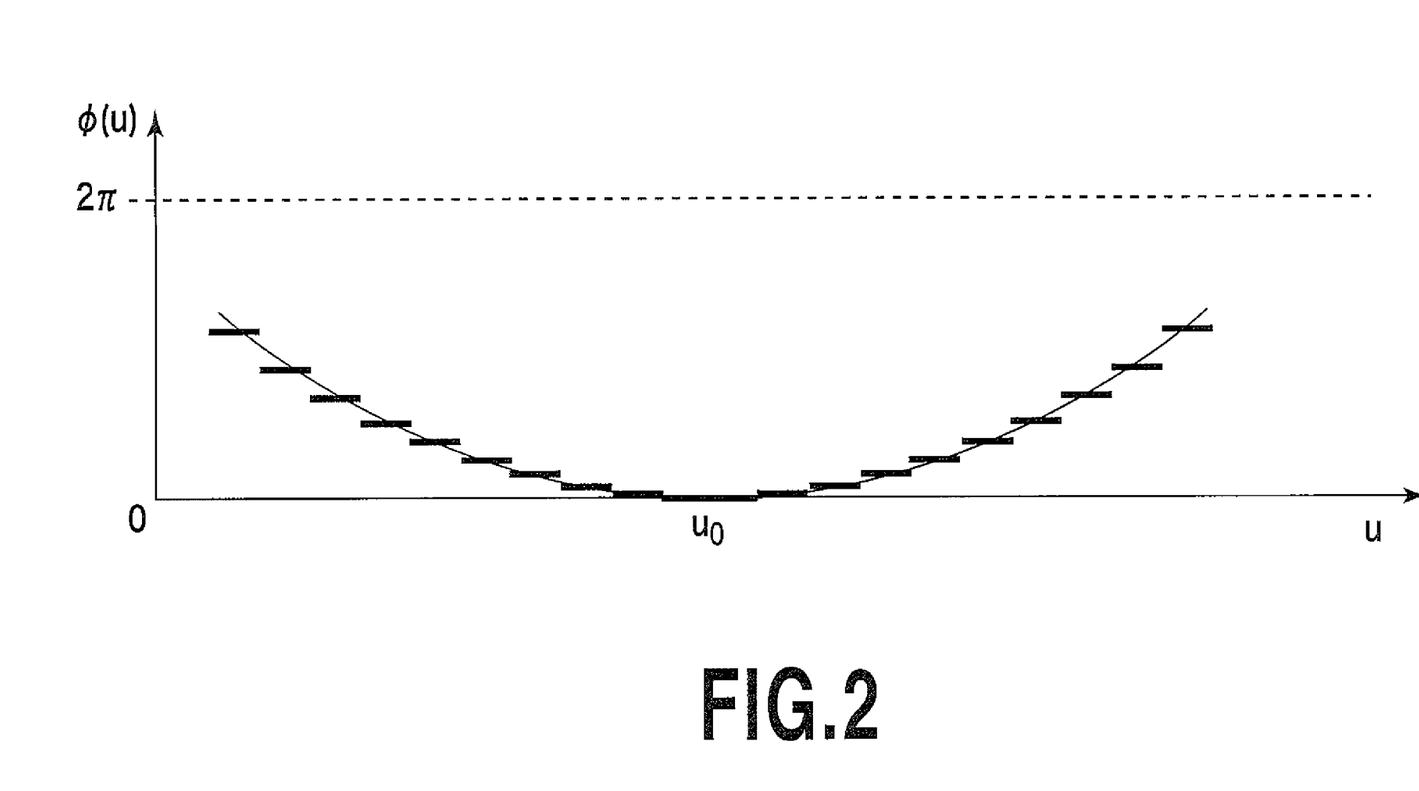
FIG. 2 illustrates an example of a phase distribution given to a spatial phase control device.

FIG. 2 illustrates an example of a phase distribution given to the spatial phase control device. The spatial phase control device 8 has thereon element devices (i.e., pixels) that are discretely arranged along the u axis direction. The distribution of phases given by the pixels is discretized. Specifically, when assuming that ith pixel has a center coordinate ui, the phase shift given by the ith pixel is φ(ui). For example, the phase shift given by the MEMS phase modulation device has a stepwise distribution as shown in FIG. 2 (see Non-Patent Publication 2). It is noted that the X axis of FIG. 1 corresponds to the u axis of FIG. 2.

Next, the following section will describe the phase control of the space phase control device in the dispersion compensator of the present invention.

When attention is paid on a optical signal having a certain wavelength in the dispersion compensator shown in FIG. 1, the outgoing angle $\theta_A$ of the optical signal from the AWG 1 has the temperature dependency $\Delta\theta_A$ as shown in the following formula.

$$\Delta\theta_A = \frac{n_g L}{d} \frac{dn}{dT} \Delta T \quad \text{formula (2)}$$

More specifically, $\Delta\theta_A/\Delta T = 2.86 \times 10^{-5}$ (rad/degree(s) C). In the formula (2), it is assumed that the center wavelength is 1587.043 nm, the difference in the array waveguide length L is 30.54 μm, an array waveguide spacing d is 12 μm, a group refractive index $n_g$ is 1.48, and a thermo-optic constant of silica glass (dn/dT) is $1.1 \times 10^{-5}$.

When the temperature changes, the temperature dependency of the outgoing angle from the above-described AWG 1 causes the focusing point position on the spatial phase control device to shift on the x axis. Here, the focal length f of the focusing lens 7 is 100 mm. When the temperature change width is 50 degrees C., this shift amount is b=0.14 mm. In the optical signal processing device of the present invention, the phase pattern itself set to the spatial phase control device is translated parallelly to the x axis with a distance linked with the above-described shift of the focusing position.

Figure 3A:
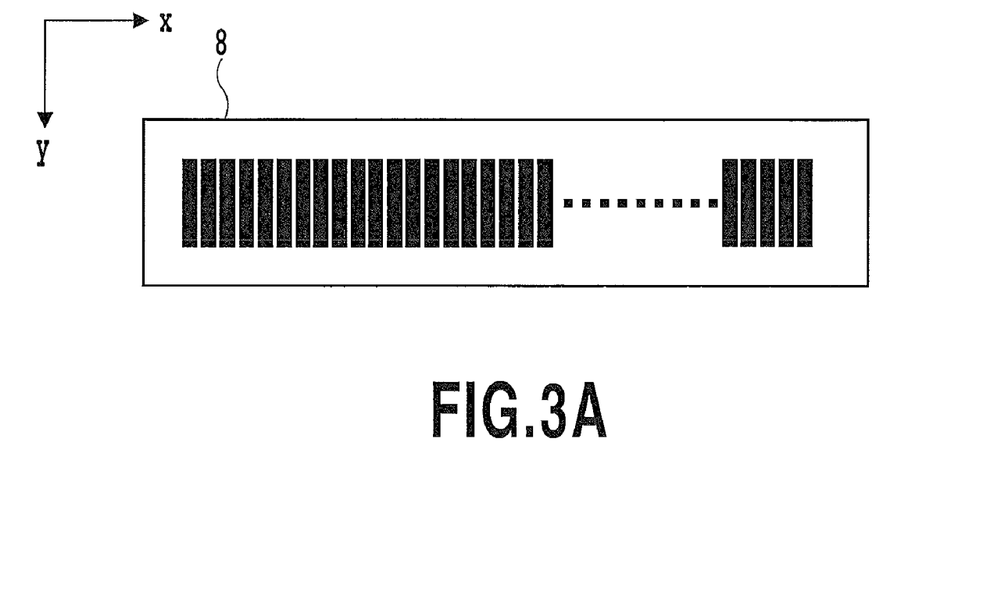
FIG. 3A illustrates the configuration of the spatial phase control device in an optical signal processing device of the present invention.
Figure 3B:
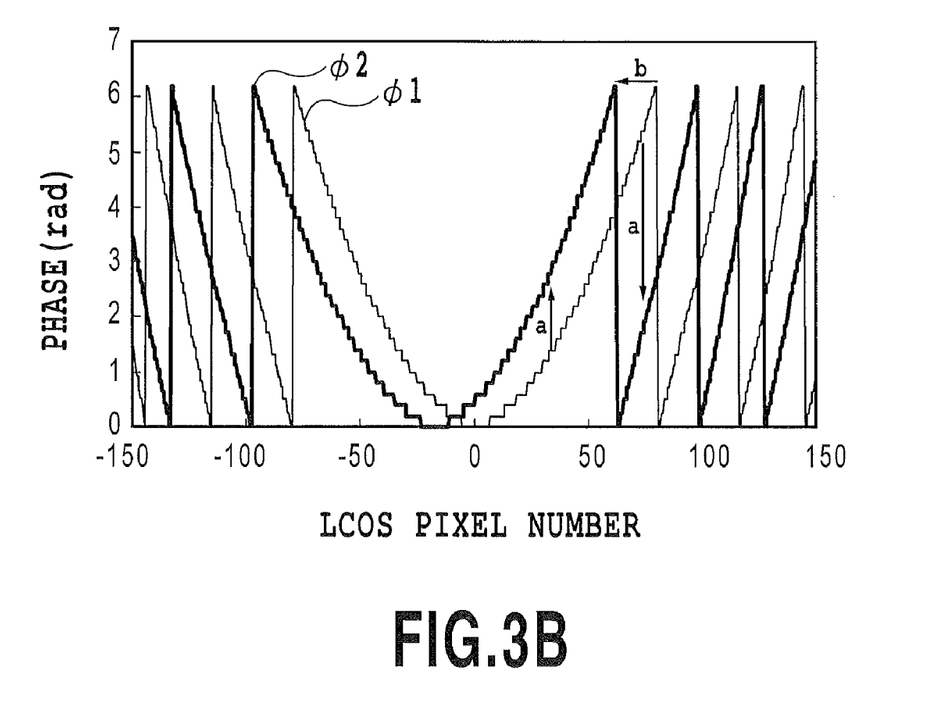
FIG. 3B illustrates a phase pattern of the spatial phase control device in the optical signal processing device of the illustrative embodiment 1.

FIG. 3A and FIG. 3B illustrate the spatial phase control device and the phase pattern in the optical signal processing device of the present invention, respectively. The following section will describe as an example a case of a liquid crystal on silicon (LCOS) in which the invention of this application operates most effectively.

The LCOS means a liquid crystal cell having a fine driving electrode pixel array made by the LSI manufacture technique. Although the LCOS has a pixel array structure, only the driving electrode is subjected to pixelation and a liquid crystal layer giving a phase change to light is continuous. It is easy to fabricate the fine electrode pixels. Thus, when compared with the above-described MEMS in which each pixel has a mirror movable section, the LCOS can be manufactured with a low cost to have a narrow pitch and more pixels. Specifically, the optical signal processing device using the LCOS can provide the advantage of the present invention more effectively. An increased number of pixels in the LCOS can provide the control of the phase or intensity of an optical signal with a high wavelength resolution and in a wide wavelength range.

In the present invention, the temperature compensation is performed by pixels. Thus, more accurate temperature compensation can be realized by using the LCOS having a narrow pixel pitch and a great number of pixels to increase the number of pixels allocated to the respective optical signal. Furthermore, the invention is characterized in that, since the temperature compensation is realized by only changing a driving voltage pattern, no movable section exists at all and reliability and stability are obtained.

With referee to FIG. 3A again FIG. 3A illustrates the structure of the spatial phase control device 8 of the LCOS type. In the x axis direction, a plurality of rectangular pixels (liquid crystal element devices) are provided. Although not shown in FIG. 3A, each pixel corresponds to a driving electrode and has a pixel array structure. FIG. 3B illustrates a phase pattern given by the LCOS. In the graph of FIG. 3B, the horizontal axis shows the pixel number of the LCOS and the vertical axis shows the phase (rad) set by each pixel. It is noted that the horizontal axis of FIG. 3B corresponds to the wavelength of the optical signal. The x axis of FIG. 3A corresponds to the horizontal axis (pixel number) of FIG. 3B. The x axis of FIG. 3A corresponds to the intersection of a dispersion plane and a signal processing means by the AWG of FIG. 1. It is noted that, for the understanding of the drawings, the horizontal axes of FIG. 3A and FIG. 3B do not have an identical scale. It is also noted that, although FIG. 3B shows the individual pixels in a stepwise manner, the pixels are not shown to match the number of pixels (pixel number) for the description of the invention.

The optical phase shift given to an optical signal having entered each pixel of the LCOS is a function of the driving voltage applied to each pixel directly. Generally, by a driving voltage of a few volts, a $2\pi$-rad phase shift can be applied to the optical signal. The following section will describe, in order to provide an easy understanding of the concept, the operation of the present invention by a phase shift given to an optical signal by a driving voltage instead of an actually-controlled driving voltage.

In the phase shift setting of FIG. 3B, a phase shift from which an integral multiple of $2\pi$ was deducted is shown for an example when the phase shift given by the LCOS exceeds $2\pi$ ($\approx 6.28$). Even when the integral multiple of $2\pi$ was deducted as described above, the same phase shift can be provided based on the property of the phase. It is noted that setting a phase shift from which the integral multiple of $2\pi$ is deducted is synonymous with giving a phase shift of a remainder having $2\pi$ as a divisor.

In the present invention, the optical signal modulation profile formed by the spatial phase control device is changed in accordance with the AWG temperature. For example, the phase pattern is changed from $\phi 1$ to $\phi 2$. Then, the phase shift given by each pixel changes as shown by the arrow a. As described above, when the AWG temperature fluctuation width is 50 degrees C., the focusing point position shifts by b=0.14 mm. For temperature compensation, the phase pattern is shifted from $\phi 1$ to $\phi 2$ by the same shift of b=0.14 mm. Specifically, in this illustrative embodiment, since the pixel pitch is 15 μm, the temperature compensation can be achieved by shifting the phase pattern by a distance corresponding to 9 to 10 pixels.

In order to obtain the above-described phase pattern, the driving voltage of each pixel may be changed depending on each phase pattern. Based on the temperature information detected by the temperature detection means 15 in FIG. 1, the temperature compensation control section 16 can control the phase pattern of the LCOS via the spatial phase control device driving section 17.

In FIG. 3B, when a phase shift to be set is changed from $\phi 1$ to $\phi 2$, it is not preferred to give a temporally-discontinuous phase change to an optical signal. The reason is that, there is a possibility where, at the moment of the phase changes, the signal quality may deteriorate. In order to avoid this, translating the phase pattern by one pixel may be repeated until the required shift amount b is reached. The repetition cycle for this may be longer than the response time of the LCOS. This driving method can minimize the discontinuous change of the phase shift of each pixel.

In the case where even the above-described driving method results in pixels forming discontinuous points for which a phase difference between neighboring pixels is $2\pi$, a temporally-discontinuous phase change of $2\pi$ is caused. However, in the present invention, the optical signal has a beam diameter larger than the pixel interval. Thus, since the discontinuous change of one pixel only has a partial influence on the phase of the optical signal, the signal deterioration is sufficiently reduced. In this illustrative embodiment, the focusing beam diameter on the LCOS (i.e., a diameter at which the optical signal intensity is an $e^{-2}$ of the peak) is 50 μm and the pitch of the signal processing element device of the LCOS (pixel pitch) is 15 μm.

Since the optical signal processing device has a fixed heat capacity, the temperature change due to a disturbance such as a change in the external temperature remains at a relatively-slow and finite speed. In such a case, when the shift amount b of the focusing point position reaches the interval of neighboring pixels, the LCOS phase pattern is shifted by one pixel. More specifically, a case will be considered of a temperature change of 10 degrees C. per minute. In this case, the wavelength emitted from the AWG at a certain fixed angle changes by 0.1 nm per minute. When the wavelength interval of the WDM optical signal is 0.8 nm and when 300 pixels are applied in the linear dispersion direction to each optical signal as shown in FIG. 3B, one pixel corresponds to the wavelength of 0.8 nm/3000.0027 nm. A change by an amount corresponding to one pixel requires 0.0027 nm/(0.1 nm/minute)×60 seconds≈1.6 seconds. Generally, since the response speed of the LCOS is equal to or lower than 0.1 second, it is sufficiently possible to perform the driving for repeating the shifting by one pixel.

As a temperature compensation control method, the formula (1) can be used to calculate the travel amount of the focusing point on the LCOS to thereby determine the phase pattern. Alternatively, a more complicated empiric formula also may be used that is obtained in advance fitting an actual fluctuation amount of the focusing point which is experimentally measured by giving a temperature change to the entire optical signal processing device. The use of the method as described above also can compensate a temperature dependency based on a high order temperature coefficient of the AWG.

The above-described control of the phase pattern can be carried out by storing in the temperature compensation control section the data for driving conditions of the LCOS at a plurality of discrete temperature points. In the case of the control as described above, the phase pattern changes discretely by the temperature change. However, an interval between temperature points may be determined depending on the accuracy of the temperature compensation required for the optical signal processing. Alternatively, compensation also may be achieved by an appropriate interpolation between the respective pieces of temperature data. It is also possible to use a combination of the phase pattern control of the present invention with another temperature compensation method for continuously performing a temperature compensation control depending on a temperature detection signal of a temperature detection means.

An actual optical signal processing device may show, in some cases, a temperature dependency for which the theoretical expectation of the optical characteristic is difficult. Such a temperature dependency is caused when a plurality of causing factors are superposed and have an influence to one another. Such causing factors include a stress on the AWG and a difference in the temperature coefficient among the respective members including an optical bench. The temperature dependency as described above is complicated and it is difficult to approximate the temperature dependency by a mathematical formula for example.

In such a case, the shift amount b by the influence from the above-described entire optical system is measured with giving a temperature change to the optical signal processing device after the optical signal processing device is assembled. Based on this shift amount b, is it possible to calculate a calibration factor required to achieve athermalization. The data corresponding to a calibration factor at each temperature can be recorded in a memory included in the temperature compensation control section 16. Then, this calibration data can be used to control the phase pattern of the spatial phase control device.

According to the calibration method as described above, since this method is based on the evaluation result by an actual, this method can provide more accurate temperature compensation based on an actual behavior of the optical signal processing device.

The above-described embodiment has described an application example for the dispersion compensator as an optical signal processing device for which the temperature dependency of the AWG is subjected to temperature compensation. In the dispersion compensator, the dispersion compensation performance is defined based on the optical signal modulation profile formed based on a plurality of element devices of the spatial light modulator as a modulation unit. Thus, the direct control of the phase pattern as in the present invention is very useful. However, the present invention is not limited to the dispersion compensator and also can be applied to other optical signal processing devices using a spatial light modulator. For example, in the wavelength blocker, switching is generally performed based on one pixel corresponding to each optical signal. Here, the present invention can be applied to a configuration where a plurality of pixels are assigned to and control each optical signal. For example, a temperature compensation control is possible where 128 pixels are assigned to each optical signal and the assignment for pixels is shifted by one pixel at a time depending on a predetermined temperature fluctuation amount.

Illustrative Embodiment 2

The dispersion compensator of FIG. 1 that has been described heretofore has a configuration in which a focusing lens is included in the spatial optical system and an optical signal is focused on the spatial phase control device. In this case, the beam diameter on the spatial phase control device as an optical coupling plane may be larger than the pixel repetition cycle of the element device. The present invention also can be applied to an optical signal processing device not including a focusing lens such as a tunable wavelength filter. Even in the case of the optical signal processing device having a configuration not including a focusing lens, it is possible to compensate the temperature dependency of the spectroscopic characteristics of a spectroscopic element such as AWG. Next, the following section will describe an example of an optical signal processing device that uses a spatial phase control device as a signal processing device and that has a function of a tunable wavelength filter.

Figure 4:
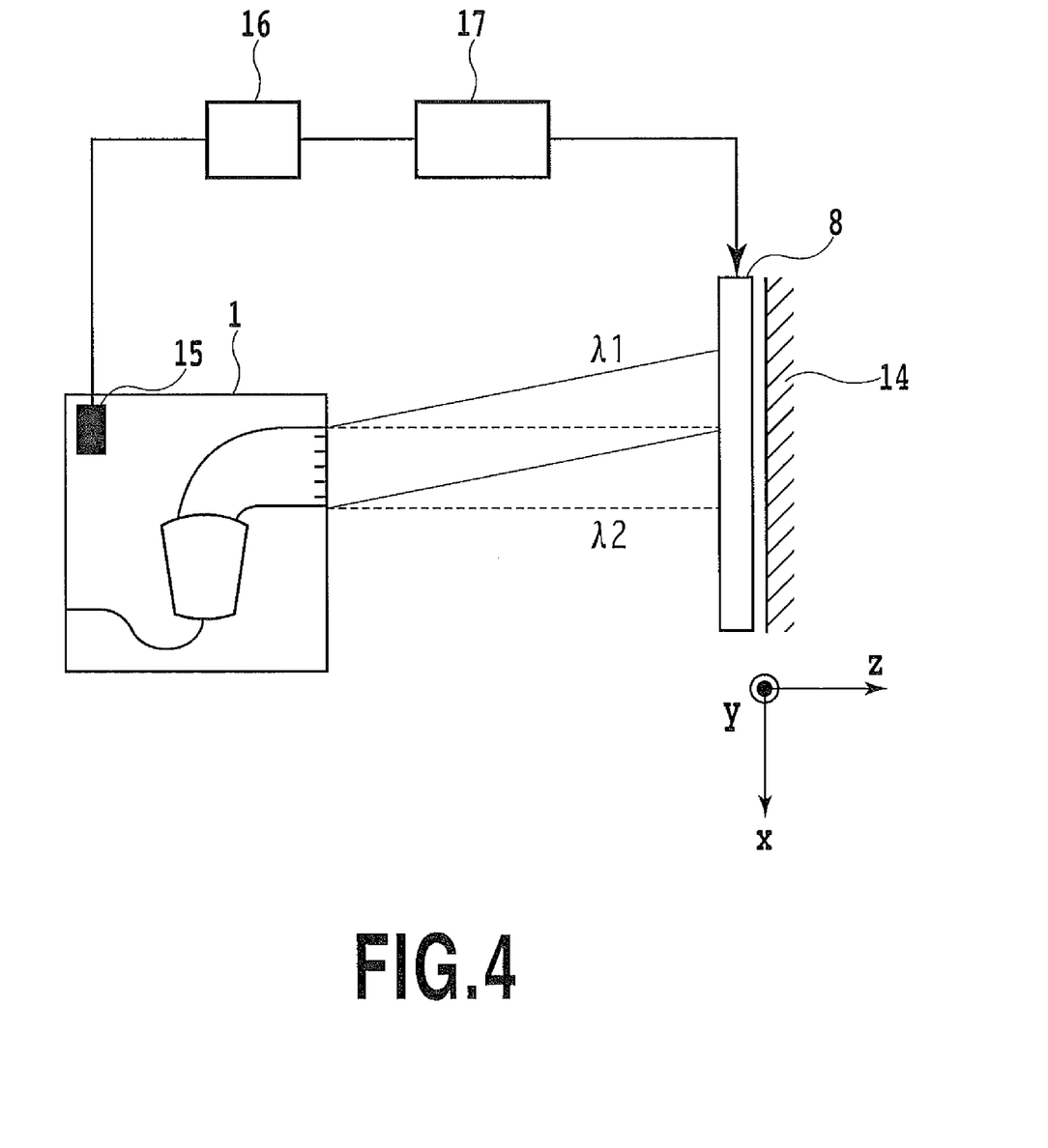
FIG. 4 illustrates the configuration of an optical signal processing device for which the temperature dependency of AWG according to the illustrative embodiment 2 of the present invention is compensated.

FIG. 4 illustrates the configuration and operation of a tunable wavelength filter using a spatial phase control device such as liquid crystal according to the illustrative embodiment 2 of the present invention. This illustrative embodiment also shows a case where the LCOS is used as a spatial phase control device. With reference to FIG. 4, a plurality of optical signals having different wavelengths are emitted from the AWG 1 in the z axis direction at outgoing angles depending on the wavelengths. The spatial phase control device 8 is combined with a mirror 14 and operates as a tunable wavelength filter. The spatial phase control device 8 can operate as a tunable angle prism that can reflect in an identical direction only an optical signal having entered at a specific incidence angle. When each pixel of the liquid crystal device of the space phase control device 8 gives a different phase shift in a stepwise manner, a smooth phase change as in a prism can be given in an equivalent manner.

Figure 5:
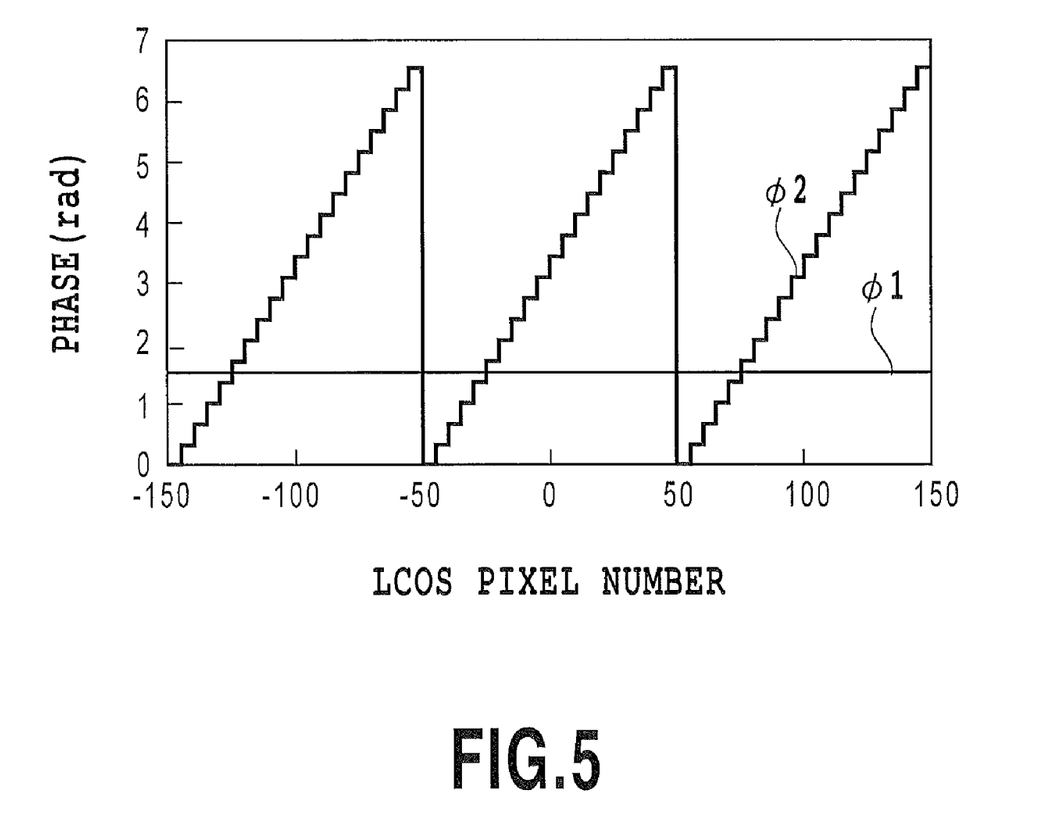
FIG. 5 illustrates a phase pattern of a phase control device in the optical signal processing device of the illustrative embodiment 2.

FIG. 5 illustrates a phase pattern given by the LCOS in the illustrative embodiment 2. When a phase shift for which each pixel of the LCOS is equal is given such as $\phi 1$ of FIG. 5, the LCOS has the same function as that of a plane mirror. Thus, in FIG. 4, an optical signal that is emitted from the AWG 1 and that vertically enters the spatial phase control device (LCOS) 8 (i.e., an optical signal of $\lambda 2$) is reflected in the incident light path direction and propagates in the opposite direction along the incident light path and is outputted via the AWG 1. On the other hand, since optical signals having other wavelengths have different incidence angles to the spatial phase control device 8, the reflection light does not move along the incident light path and is not outputted from the AWG 1. Thus, the optical signal processing device having the configuration shown in FIG. 4 operates as a tunable wavelength filter that selects the optical signal having a wavelength $\lambda 2$ only.

When pixels of the LCOS gives a periodic phase of a linear function as in $\phi 2$ of FIG. 5, the LCOS has an action similar to that of an inclined mirror. Thus, the LCOS reflects in the incident light path direction only an optical signal having the same incidence angle as the inclination. As a result, as in the description of the phase characteristic of $\phi 1$, the LCOS functions as a tunable wavelength filter that selects an optical signal having a wavelength $\lambda 1$ only.

Although FIG. 5 represents the individual pixels by showing the graph in a stepwise manner, it is noted that the pixel numbers (numbers) of the LCOS of the horizontal axis are not shown to match the stepwise shape for the description of the present invention.

Also in this illustrative embodiment of FIG. 4, as in the illustrative embodiment 1, the temperature detection means 15 is placed on the AWG 1 and a temperature detection signal showing the temperature of the AWG 1 is supplied to the temperature compensation control section 16. The temperature compensation control section 16 performs a control so as to appropriately drive the spatial phase control device 8 in accordance with the temperature detection signal. A control signal is supplied from the temperature compensation control section 16 to the spatial phase control device driving section 17. Then, the spatial phase control device driving section 17 supplies a driving signal to the spatial phase control device 8 to set a predetermined optical signal modulation profile (i.e., phase pattern).

Also in this tunable wavelength filter, as in the illustrative embodiment 1, the temperature dependency of the outgoing angle of the AWG is calculated based on the formula (2). Thus, a phase pattern may be determined based on the outgoing angle of the AWG 1 based on which a desired characteristic of the tunable wavelength filter is obtained and the temperature dependency $\Delta\theta^A$ calculated based on the formula (2). Specifically, since the reflection angle is determined based on the above-described inclination of the periodic phase pattern of a linear function of the LCOS, the inclination of the periodic phase pattern of a linear function can be changed so that the reflection angle changes by an amount of $\Delta\theta_A$, thereby allowing the characteristic of the tunable wavelength filter to be independent from the temperature change.

As described above, in the spatial light modulator composed of a plurality of element devices (pixels) such as LCOS, the present invention can be applied to any type of optical signal processing device so long as the optical signal processing device can control an element device having a function to modulate an optical signal so as to change the optical signal modulation profile depending on a temperature fluctuation.

Although the illustrative embodiment 1 has showed the configuration for processing one optical signal, it is also possible to use the AWG having the Free Spectral Range (FSR) equal to or wider than the wavelength range of the WDM optical signal band (i.e., an wavelength spacing of neighboring optical signals×the number of optical signals) to configure a dispersion compensator that can simultaneously control a plurality of optical signals on the LCOS. Since the control of each optical signal can be performed independently, the temperature compensation by the present invention can be applied to each optical signal in a completely equal manner.

Although the illustrative embodiment 1 has exemplarily showed the dispersion compensator in which an optical signal was reflected by the LCOS configuration, another dispersion compensator also can be used that uses a liquid crystal device composed of a glass substrate. In this case, the liquid crystal device may be used to transmit light or to reflect light.

Furthermore, in addition to the dispersion compensator as shown in FIG. 1 in which the LCOS is used as a spatial phase control device, it is also possible to configure a wavelength blocker (hereinafter simply referred to as WB) used as a variable optical attenuator or a wavelength selective switch (hereinafter simply referred to as WSS) in which the LCOS is used as light deflector. According to the configuration or method of the present invention, a WB and WSS using a liquid crystal device and a LCOS also can achieve athermalization as exactly in the case of the above-described illustrative embodiments. It is noted that any spatial light modulator may be used so long as the spatial light modulator can subject an optical signal to a signal processing such as modulation with regard to the phase or the amplitude or both of the phase and the amplitude.

Although an example has been described where the LCOS or a liquid crystal device was used as a spatial phase control device as described above, the present invention is characterized in using a signal processing device that has, as a modulation unit, a plurality of element devices that are finer than a light beam diameter. Although a spatial phase control device such as the LCOS is preferred, the invention is not limited to this. The invention also can provide exactly the same effect even when other types of spatial phase control devices are used. The spatial phase control device as described above includes, for example, an MEMS mirror device.

Although the above-described illustrative embodiment 1 and illustrative embodiment 2 has described a case where the spectroscopic means was AWG, the effect of the invention also can be obtained when the spectroscopic means is a prism or a grating.

As described above in detail, according to the present invention, by directly controlling the optical signal modulation profile formed based on a configuration unit of a spatial light modulator, it is possible to achieve athermalization in the characteristic of the optical signal processing device in a simpler and low-cost manner. Furthermore, calibration data calculated by giving a temperature change to an actual optical signal processing device includes all causing factors of a complicated temperature fluctuation in the entire optical system. Thus, the use of the calibration data as described above also can provide more accurate temperature compensation.

Industrial Applicability

The invention can be used for an optical signal processing device used in optical communication. The invention can be applied to a dispersion compensator, a wavelength equalizer, a wavelength variable filter, and a wavelength blocker for example.

The invention claimed is:

1. An optical signal processing device for dispersing an input optical signal to a plurality of optical signals having different wavelengths and subjecting the optical signals of the respective wavelengths to a signal processing, comprising:
    a spectroscopic means for dispersing the input optical signal to a plurality of optical signals having different wavelength to output the plurality of optical signals at an angle depending on the wavelength of the optical signal in a dispersion plane;
    a signal processing means for modulating the optical signal emitted from the spectroscopic means, the signal processing means includes a plurality of signal processing element devices provided in an intersection direction between the signal processing means and the dispersion plane, the respective plurality of signal processing element devices can control a modulation amount to the optical signals;
    a temperature detection means for detecting a temperature of the spectroscopic means or an optical system including the spectroscopic means to supply a temperature detection signal; and
    a temperature compensation control section for controlling, based on the temperature detection signal, an optical signal modulation profile formed by the plurality of signal processing element devices;
    wherein the optical signal modulation profile is controlled so as to follow a temperature fluctuation of a position of an optical signal on the intersection of the signal processing means or an incident angle to the intersection of the signal processing means, the temperature fluctuation is caused by a temperature dependency of the spectroscopic means or the optical system including the spectroscopic means.

2. The optical signal processing device according to claim 1, further comprising:
    a focusing means for focusing the dispersed optical signal to an optical signal focusing plane of the signal processing means, the focusing means is located in a light path between the spectroscopic means and the signal processing means,
    wherein the signal processing element devices are arranged with an arrangement pitch that is smaller than a beam diameter of the optical signal focused by the focusing means.

3. The optical signal processing device according to claim 2, wherein the signal processing element device of the signal processing means comprises a spatial intensity modulation device for modulating an intensity of an optical signal and the temperature compensation control section sets an intensity modulation pattern depending on the temperature detection signal.

4. The optical signal processing device according to claim 1, wherein the signal processing element device of the signal processing means comprises a spatial phase modulation device that can apply a predetermined phase shift to an optical signal and the temperature compensation control section sets a phase pattern depending on the temperature detection signal.

5. The optical signal processing device according to claim 2, wherein the signal processing element device of the signal processing means comprises a spatial phase modulation device that can apply a predetermined phase shift to an optical signal and the temperature compensation control section sets a phase pattern depending on the temperature detection signal.

6. The optical signal processing device according to claim 5, wherein the optical signal processing device is a dispersion compensator that uses a spatial phase modulator as the signal processing means.

7. The optical signal processing device according to claim 6, wherein as the optical signal modulation profile, a phase pattern of a quadratic function or a remainder having $2\pi$ as a divisor and a quadratic function as a dividend as a function of the coordinate axis of the intersection direction is given and the plurality of signal processing element devices are controlled so as to move the phase pattern in the intersection direction by a distance corresponding to the temperature detection signal.

8. The optical signal processing device according to claim 3, wherein the optical signal processing device is a wavelength blocker using a spatial intensity modulator as the signal processing means in which a plurality of the signal processing element devices are allocated to each optical signal.

9. The optical signal processing device according to claim 4, wherein the optical signal processing device is a tunable wavelength filter using a spatial phase modulator as the signal processing means.

10. The optical signal processing device according to claim 1, wherein the temperature compensation control section includes a means for storing data for controlling the signal processing element devices such that the optical signal modulation profile formed by the plurality of signal processing element devices corresponds to a temperature of the spectroscopic means or an optical system including the spectroscopic means detected by the temperature detection means.

11. The optical signal processing device according to claim 2, wherein the temperature compensation control section includes a means for storing data for controlling the signal processing element devices such that the optical signal modulation profile formed by the plurality of signal processing element devices corresponds to a temperature of the spectroscopic means or an optical system including the spectroscopic means detected by the temperature detection means.

12. The optical signal processing device according to claim 3, wherein the temperature compensation control section includes a means for storing data for controlling the signal processing element devices such that the optical signal modulation profile formed by the plurality of signal processing element devices corresponds to a temperature of the spectroscopic means or an optical system including the spectroscopic means detected by the temperature detection means.

13. The optical signal processing device according to claim 4, wherein the temperature compensation control section includes a means for storing data for controlling the signal processing element devices such that the optical signal modulation profile formed by the plurality of signal processing element devices corresponds to a temperature of the spectroscopic means or an optical system including the spectroscopic means detected by the temperature detection means.

14. The optical signal processing device according to claim 5, wherein the temperature compensation control section includes a means for storing data for controlling the signal processing element devices such that the optical signal modulation profile formed by the plurality of signal processing element devices corresponds to a temperature of the spectroscopic means or an optical system including the spectroscopic means detected by the temperature detection means.

15. The optical signal processing device according to claim 6, wherein the temperature compensation control section includes a means for storing data for controlling the signal processing element devices such that the optical signal modulation profile formed by the plurality of signal processing element devices corresponds to a temperature of the spectroscopic means or an optical system including the spectroscopic means detected by the temperature detection means.

16. The optical signal processing device according to claim 7, wherein the temperature compensation control section includes a means for storing data for controlling the signal processing element devices such that the optical signal modulation profile formed by the plurality of signal processing element devices corresponds to a temperature of the spectroscopic means or an optical system including the spectroscopic means detected by the temperature detection means.

17. The optical signal processing device according to claim 8, wherein the temperature compensation control section includes a means for storing data for controlling the signal processing element devices such that the optical signal modulation profile formed by the plurality of signal processing element devices corresponds to a temperature of the spectroscopic means or an optical system including the spectroscopic means detected by the temperature detection means.

18. The optical signal processing device according to claim 9, wherein the temperature compensation control section includes a means for storing data for controlling the signal processing element devices such that the optical signal modulation profile formed by the plurality of signal processing element devices corresponds to a temperature of the spectroscopic means or an optical system including the spectroscopic means detected by the temperature detection means.

19. The optical signal processing device according to claim 1, wherein the spectroscopic means is an Arrayed waveguide grating (AWG) and the signal processing means is any of a liquid crystal device, an MEMS, or optical crystal.

* * * * *